United States Patent
Yun (10) Patent No.: US 7,859,195 B2
(45) Date of Patent: Dec. 28, 2010

(54) APPARATUS FOR CONTROLLING LAMP DRIVING AND LIGHT UNIT HAVING THE SAME

(75) Inventor: Chang Sun Yun, Gwangsan-Gu (KR)

(73) Assignee: LG Innotek Co., Ltd., Seoul (KR)

( * ) Notice: Subject to any disclaimer, the term of this patent is extended or adjusted under 35 U.S.C. 154(b) by 404 days.

(21) Appl. No.: 12/178,068

(22) Filed: Jul. 23, 2008

(65) Prior Publication Data

US 2009/0026971 A1    Jan. 29, 2009

(30) Foreign Application Priority Data

Jul. 24, 2007   (KR) .................. 10-2007-0074054

(51) Int. Cl.
*H05B 37/02* (2006.01)
(52) U.S. Cl. ...................... 315/220; 315/291
(58) Field of Classification Search ............ 315/185 R, 315/186, 189, 209 R, 213, 217, 220, 221, 315/277, 291, 307, 312
See application file for complete search history.

(56) References Cited

U.S. PATENT DOCUMENTS

| | | | | |
|---|---|---|---|---|
| 7,265,500 B2 * | 9/2007 | Ono et al. | .................. | 315/291 |
| 7,279,849 B2 * | 10/2007 | Lee | ............................. | 315/220 |
| 7,397,198 B2 * | 7/2008 | Oyama | ...................... | 315/282 |
| 7,525,255 B2 * | 4/2009 | Jin | .............................. | 315/174 |
| 7,633,240 B2 * | 12/2009 | Kwon | ......................... | 315/282 |

* cited by examiner

*Primary Examiner*—Douglas W Owens
*Assistant Examiner*—Minh D A
(74) *Attorney, Agent, or Firm*—Saliwanchik, Lloyd & Saliwanchik (57) ABSTRACT

Provided are an apparatus for controlling a lamp driving, and a light unit. The apparatus comprises a trans-portion, a plurality of lamps, a first cable, and a current attenuator. The trans-portion outputs a first AC power and a second AC power. The plurality of lamps are lighted-on by the first and second AC powers. The first cable and a second cable transfer an output power from the transformer to both ends of the lamps. The current attenuator removes a deviation in currents input to both ends of the lamps.

15 Claims, 6 Drawing Sheets

APPARATUS FOR CONTROLLING LAMP DRIVING AND LIGHT UNIT HAVING THE SAME

CROSS-REFERENCE TO RELATED APPLICATION

The present application claims the benefit under 35 U.S.C. §119(e) of Korean Patent Application No. 10-2007-0074054, filed on Jul. 24, 2007, which is hereby incorporated by reference in its entirety.

BACKGROUND

The present disclosure relates to an apparatus for controlling lamp driving and a light unit having the same.

Application field of a liquid crystal display (LCD) device is gradually widened due to its lightweight, slim profile, and low power consumption driving characteristics. Therefore, the LCD device is used for office automation apparatuses, audio/video apparatuses, etc.

The LCD device displays a desired image by controlling an image signal applied to a plurality of switching devices arranged in a matrix configuration, and an amount of transmitted light.

Since the LCD is not a self-luminous display device, it requires a light source such as a backlight unit.

BRIEF SUMMARY

Embodiments provide an apparatus for controlling a lamp driving that can remove deviation in a current input to both ends of a lamp, and a light unit having the same.

Embodiments provide an apparatus for controlling a lamp driving that can remove a deviation in a current input to both ends of a lamp to reduce a deviation in brightness, and a light unit having the same.

Embodiments provide an apparatus for controlling a lamp driving that can remove a deviation by a leakage current from a high voltage cable connected between an inverter board and a lamp by reducing a deviation in an output current in the inverter board, and a light unit having the same.

An embodiment provides an apparatus for controlling a lamp driving comprising: a trans-portion outputting a first AC power and a second AC power; a plurality of lamps lighted-on by the first and second AC powers; a first cable and a second cable transferring an output power from the trans-portion to both ends of the lamps; and a current attenuator removing a deviation in currents input to both ends of the lamps.

An embodiment provides an apparatus for controlling a lamp driving comprising: a first DC-AC converter outputting a first AC power; a second DC-AC converter outputting a second AC power; and a current attenuator controlling an amount of a current of the first AC power to remove a deviation in currents at both ends of a plurality of lamps.

An embodiment provides a light unit comprising: a plurality of lamps; a housing in which the plurality of lamps are disposed; an inverter board disposed on one side of the housing, the inverter board outputting a first AC power and a second AC power with a deviation in a current; a first cable connected between the inverter board and one ends of the lamps to transfer the first AC power; and a second cable connected between the inverter board and the other ends of the lamps to transfer the second AC power.

The details of one or more embodiments are set forth in the accompanying drawings and the description below. Other features will be apparent from the description and drawings, and from the claims.

DETAILED DESCRIPTION

Hereinafter, embodiments are described with reference to the accompanying drawings.

Figure 1:
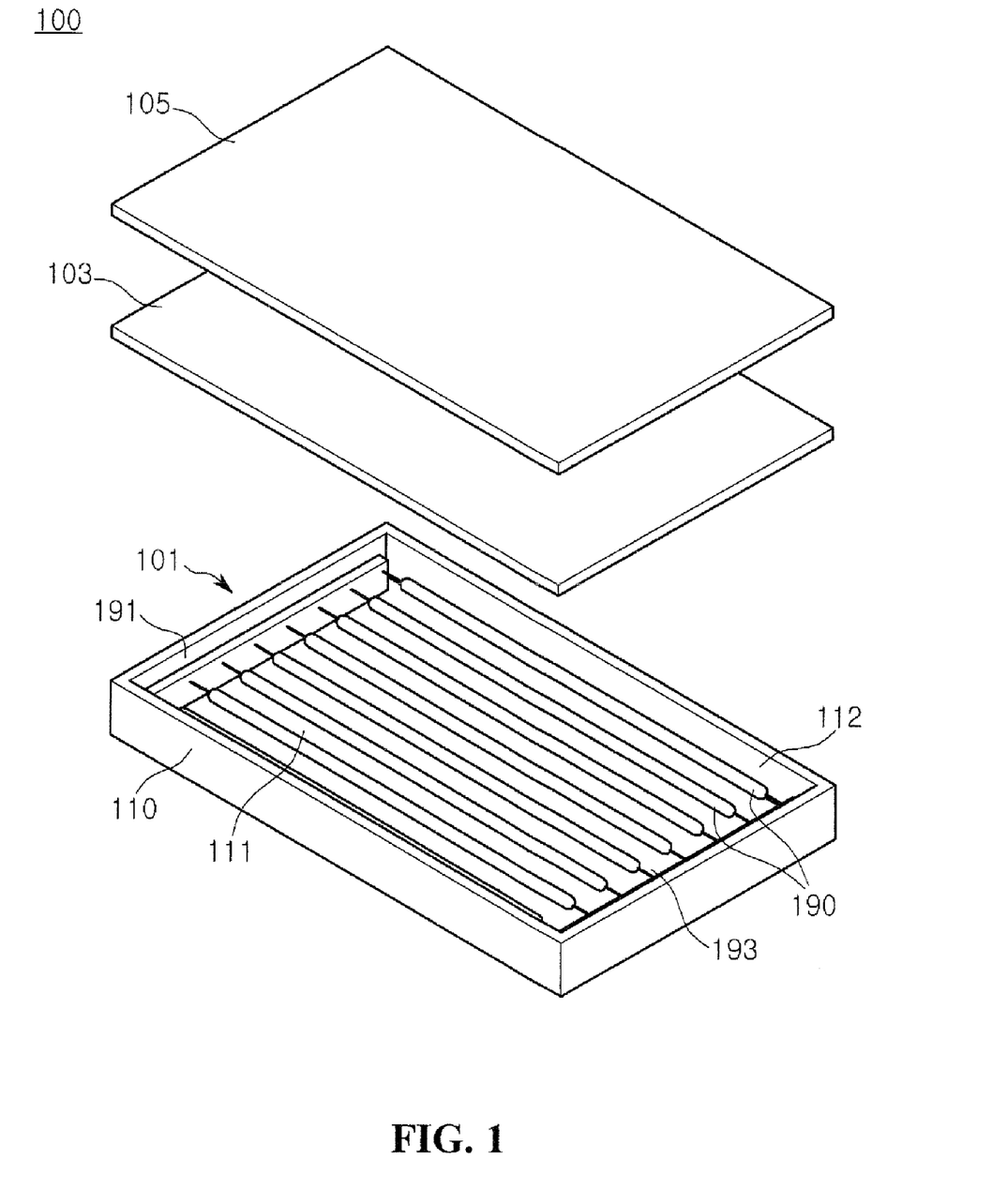
FIG. 1 is a perspective view of a display device according to an embodiment.
Figure 2:
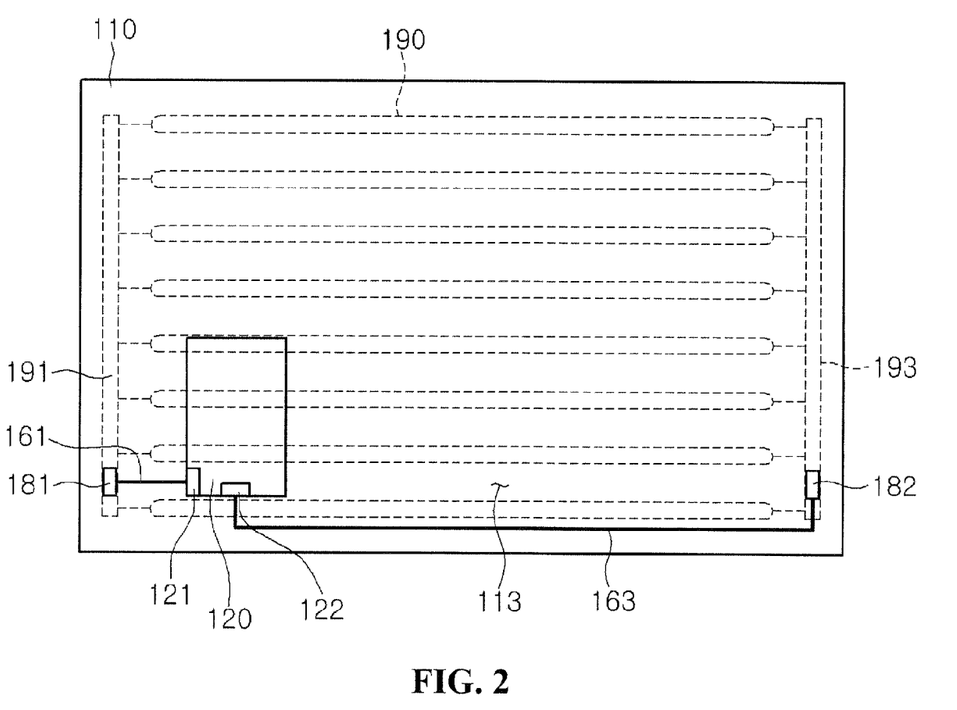
FIG. 2 is a view illustrating a rear side of the housing of FIG. 1.

FIG. 1 is a perspective view of a display device according to an embodiment, and FIG. 2 is a view illustrating a rear side of the housing of FIG. 1.

Referring to FIG. 1, the display device 100 comprises a light unit 101, an optical sheet unit 103, and a display panel 105.

The light unit 101 is a backlight unit and illuminates light onto the display panel 105.

The light unit 101 comprises a housing 110, lamps 190, and lamp connectors 191 and 193. The housing 110 can comprise a groove 111 therein and can be a metal frame. The metal can be but is not limited to at least one of Al, Mg, Zn, Ti, Ta, Hf, and Nb.

A lateral side 112 of the housing 110 can be inclined at a predetermined angle and can serve as a reflection plate reflecting light. Also, a reflective sheet (not shown) can be disposed on the bottom of the housing 110.

The plurality of lamps 190 are disposed in the inner groove 111 of the housing 110. The lamps 190 are light sources of the light unit 101, and can be realized using an external electrode fluorescent lamp (EEFL). The EEFL applies a current to external electrodes formed outside a lamp tube to induce discharge through an external electric field, thereby driving the lamp. The EEFL can save power and has a relatively extended life compared to other types of lamps, for example, cold cathode fluorescent lamp (CCFL). The lamp according to an embodiment can be at least one of an EEFL, a CCFL, a hot cathode fluorescent lamp (HCFL), an external & internal electrode fluorescent lamp (EIFL), and light emitting device (LED).

The plurality of lamps 190 are disposed in a horizontal direction in the inner groove 111 of the housing 110 and spaced from each other with a constant interval. The disposing direction of the lamps 190 can change.

The first and second lamp connectors 191 and 193 are disposed at both ends of the housing 110. The first lamp connector 191 is connected to an external electrode provided to one ends of the lamps 190, and the second lamp connector 193 is connected to an external electrode provided to the other ends of the lamps 190. The lamps 190 are lighted-on by high voltage AC signals applied through the first and second lamp connectors 191 and 193.

The optical sheet unit 103 is disposed on the light unit 101. The optical sheet unit 103 comprises a diffusion sheet and/or a prism sheet. The diffusion sheet diffuses light, and the prism sheet condenses light to a display region. The prism sheet can selectively comprise a horizontal prism sheet, a vertical prism sheet, and a brightness enhancement film.

The display panel 105 is disposed on the optical sheet unit 103. The display panel 105 displays information using light illuminated from the lower side. The display panel 105 comprises transparent first and second substrates facing each other, and a liquid crystal (LC) layer (not shown) interposed between the first and second substrates. Here, the LC panel can be realized as an LC panel to which a twisted nematic (TN), electrically controlled birefringence (ECB), optically compensated bend (OCB), in-plane switching (IPS), or vertical alignment (VA) mode can be applied, and can operate in a normally white or normally block mode. In an embodiment, an array characteristic of the substrate or the LC layer can be changed within the technical scope thereof, and is not limited thereto.

A polarizer (not shown) can be attached on the upper surface and/or the lower surface of the display panel 105.

Referring to FIGS. 1 and 2, an inverter board 120 is disposed on one side of the rear side of the housing 110. The inverter board 120 is one board type and supplies a high voltage AC signal to both ends of the lamps 190.

A main board (e.g.: television (TV) reception board), a power supply unit (e.g.: switching mode power supply (SMPS)), and the inverter board 120 are disposed on the rear side 113 of the housing 110.

Since the inverter board 120 outputs a high voltage, it is spaced by a predetermined distance from other elements. Therefore, the inverter board 120 is installed on one side of the rear side 113 of the housing 110 to prevent a high voltage from being induced to other elements.

Also, the inverter board 120 can be disposed on the left lower end of the rear side 113 of the housing 110. The inverter board 120 can be disposed at a corner such as a right corner but is not limited thereto.

The inverter board 120 comprises a first board connector 121 and a second board connector 122. The inverter board 120 outputs a master side signal through the first board connector 121, and outputs a slave side signal through the second board connector 122.

The first lamp connector 191 can comprise a first electrode connector 181, and the second lamp connector 193 can comprise a second electrode connector 182.

Both ends of a first cable 161 are connected with the first board connector 121 and the first electrode connector 181, respectively. Both ends of a second cable 163 are connected with the second board connector 122 and the second electrode connector 182, respectively. Here, the first and second cables 161 and 163 can be used as high voltage cables.

The lengths of the first cable 161 and the second cable 163 connected to the inverter board 120 are different from each other. For example, the length of the second cable 163 is relatively longer than that of the first cable 161. Also, the second cable 163 can be connected twice longer or more than the first cable 161.

A current of a high voltage flowing through the second cable 163 can leak. That is, a small amount of AC power flowing through the second cable 163 leaks, and the leakage current may cause a deviation in a current input to both ends of the lamps 190. The deviation in the current at both ends of the lamps 190 may be represented as a brightness difference. The embodiment removes the deviation in the current to obtain a uniform brightness distribution.

In the embodiment, the inverter board 120 controls an amount of a current output from the first board connector 121 and the second board connector 122 to allow the almost same amount of a current to be supplied to both ends of the lamps 190 even when the current leaks through the second cable 163.

Figure 3:
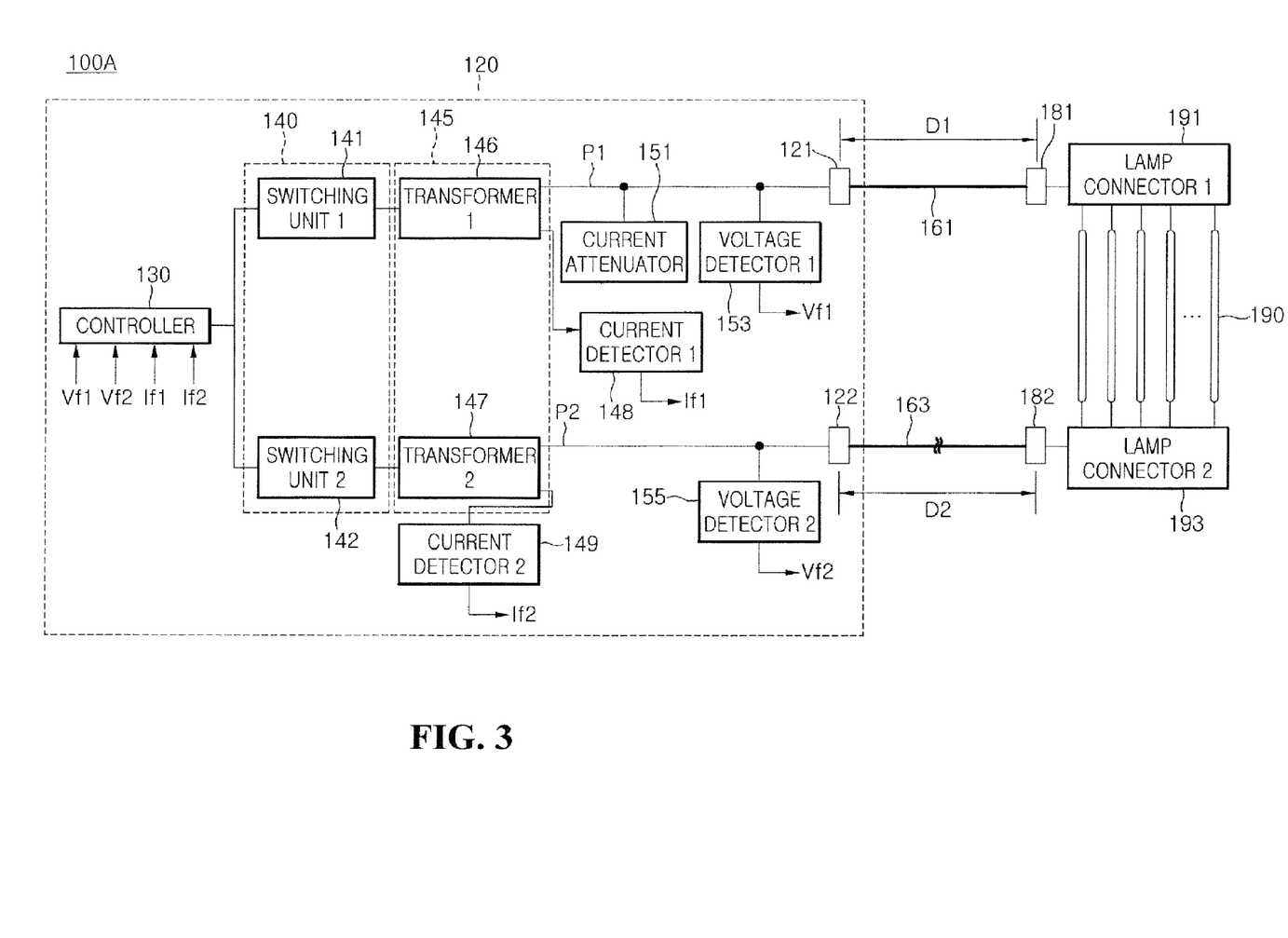
FIG. 3 is a block diagram of an apparatus for controlling a lamp driving according to a first embodiment.

FIG. 3 is a block diagram of an apparatus for controlling a lamp driving according to a first embodiment.

Referring to FIG. 3, the apparatus for controlling a lamp driving 100A comprises the inverter board 120, the first and second cables 161 and 163, the first and second electrode connectors 181 and 182, the first and second lamp connectors 191 and 193, and the plurality of lamps 190.

The inverter board 120 comprises a controller 130, a switching portion 140, a trans-portion 145, a first current detector 148, a second current detector 149, a current attenuator 151, a first voltage detector 153, and a second voltage detector 155.

The controller 130 outputs a gate drive signal to the switching portion 140. The controller 130 can control the gate drive signal in response to fed-back current signals If1 and If2, and fed-back voltage signals Vf1 and Vf2.

The switching portion 140 comprises a first switching unit 141 and a second switching unit 142. The trans-portion 145 comprises a first transformer 146 and the second transformer 147.

The first and second switching units 141 and 142 comprise a plurality of switching devices, and the switching devices are driven by the gate drive signal. The switching device can be realized in a metal oxide semiconductor field effect transistor (MOSFET), but is not limited thereto.

The first and second switching units 141 and 142 are inverters, and serve as DC-DC converters switching an input power and supplying the same to the trans-portion 145. The first and second switching units 141 and 142 can be operated by using a full-bridge circuit or two half-bridge circuits.

The first and second transformers 146 and 147 raise power input from the first and second switching units 141 and 142 to a high voltage, and output a first AC power and a second AC power. The first AC power and the second AC power are signals having a phase difference of 180°, or comprise a signal of a positive polarity and a signal of a negative polarity. The first transformer 146 and the second transformer 147 serve as DC-AC converters.

The first current detector 148 detects an output current If1 of the first transformer 146 to feed back the same to the controller 130. The second current detector 149 detects an output current If2 of the second transformer 147 to feed back the same to the controller 130. The controller 130 can control a gate drive signal using the fed-back currents If1 and If2.

Also, a high voltage Vf1 output from the first transformer 146 is detected by the first voltage detector 153, and fed-back to the controller 130. A high voltage Vf2 output from the second transformer 147 is detected by the second voltage detector 155, and fed-back to the controller 130. Therefore, the controller 130 can control output voltages of the first transformer 146 and the second transformer 147 to be constant according to the detected voltages Vf1 and Vf2.

The first AC power of a high voltage output from the first transformer 146 is supplied to one ends of the lamps 190 through the first board connector 121, the first cable 161, the first electrode connector 181, and the first lamp connector 191.

The second AC power of a high voltage output from the second transformer 147 is supplied to the other ends of the lamps 190 through the second board connector 122, the second cable 163, the second electrode connector 182, and the second lamp connector 193.

The current attenuator 151 attenuates the first AC power of the first transformer 146 by a current leakage amount at the second cable 163. Here, the current attenuator 151 is connected in parallel to a path P1 between the first transformer 146 and the first board connector 121, and attenuates almost the same amount of a current as the current leaking through the second cable 163. Also, the current attenuator 151 can be connected between the first transformer 146 and one ends of the lamps 190, and the connection position is not limited to the above position.

The inverter board 120 intentionally attenuates a current of the first AC power output to the first board connector 121 through the first path P1. The amounts of currents output through the first board connector 121 and the second board connector 122 of the inverter board 120 are output with a deviation.

Also, the first AC power output to the first board connector 121 is transferred to the first electrode connector 181 through the first cable 161. At this point, a current flowing through the first cable 161 does not almost leak.

The second AC power output to the second board connector 122 is transferred to the second electrode connector 182 through the second cable 163. At this time, the second cable 163 is relatively longer than the first cable 161, so that a current flowing through the second cable 163 leaks.

The first electrode connector 121 transfers the first AC power to the first lamp connector 191, and the second electrode connector 122 transfers the second AC power to the second lamp connector 193. Accordingly, almost the same amounts of currents are input to both ends of the lamps 190 through the first lamp connector 191 and the second lamp connector 193 without deviation. As the same amounts of currents are supplied to both ends of the lamps 190, the brightness of the lamps 190 can become uniform.

Figure 4:
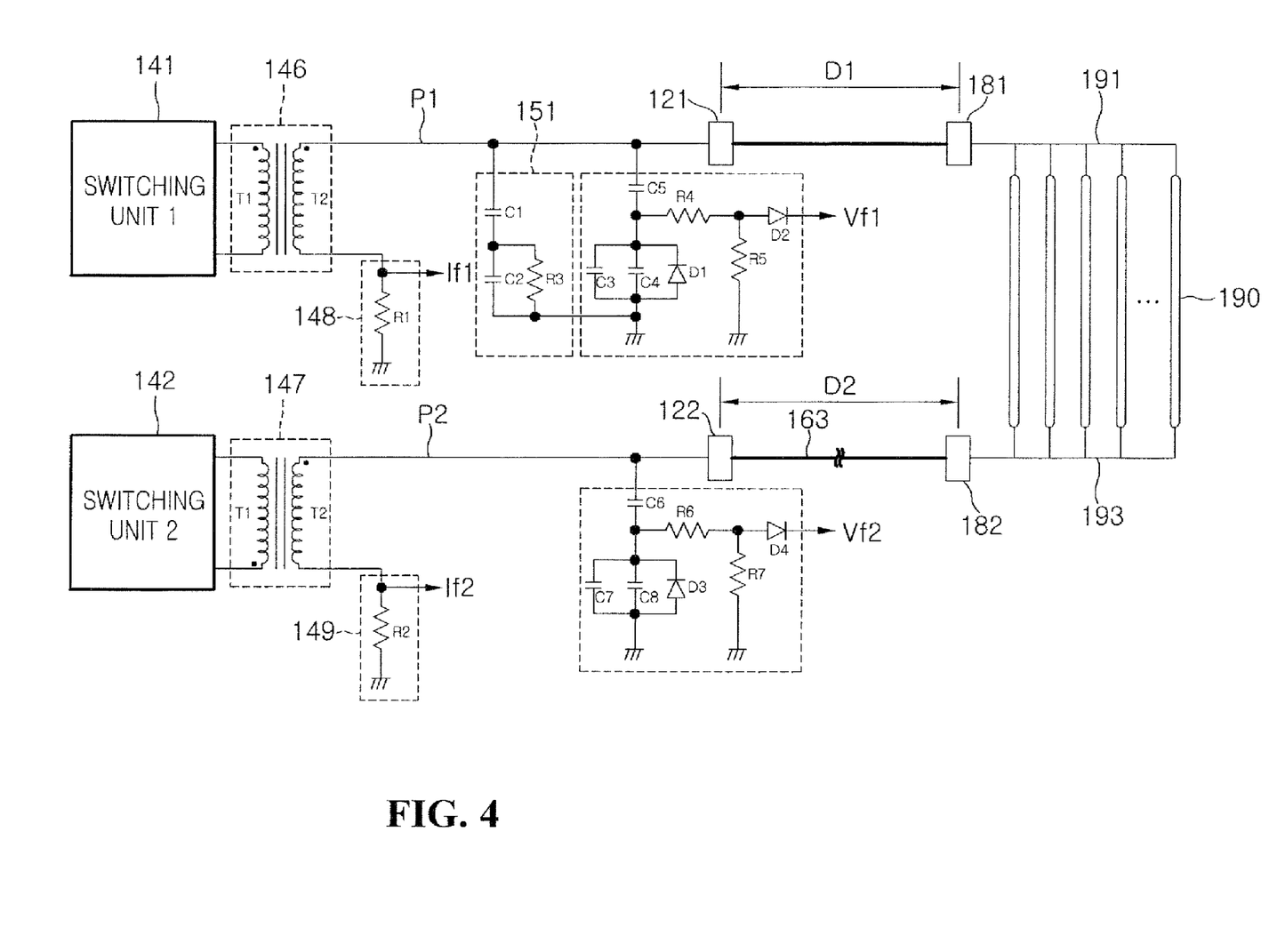
FIG. 4 is a diagram of the partial circuit of FIG. 3.

FIG. 4 is the partial circuit diagram of FIG. 3.

Referring to FIGS. 3 and 4, when the output power of the first switching unit 141 is input to a first coil T1 of the first transformer 146, the first transformer 146 outputs a high voltage power by a turns-ratio of the first coil T1 and a second coil T2 the first transformer 146.

When the output power of the second switching unit 142 is input to a first coil T1 of the second transformer 147, the second transformer 147 outputs a high voltage power by a turns-ratio of the first coil T1 and a second coil T2 of the second transformer 147.

The first coil T1 and the second coil T2 of the first transformer 146 serve as a first DC-AC converter, and the first coil T1 and the second coil T2 of the second transformer 147 serve as a second DC-AC converter.

A first current detector 148 is connected to a low end of the second coil T2 of the first transformer 146. The first current detector 148 detects a current flowing through a first resistor R1 whose one end is grounded to transfer the detected current to the controller 130.

A second current detector 149 is connected to a low end of the second coil T2 of the second transformer 147. The second current detector 149 detects a current flowing through a second resistor R2 whose one end is grounded to transfer the detected current to the controller 130.

The current attenuator 151 comprises a first capacitor C1, a second capacitor C2, and a third resistor R3. The first capacitor C1 is connected in parallel to a path P1 at a high end of the second coil T2 of the first transformer 146. The second capacitor C2 is connected in series to the first capacitor C1, and one of the second capacitor C2 is grounded. The third resistor R3 is connected in parallel to both ends of the second capacitor C2.

The current attenuator 151 attenuates a current of the first AC power using capacitances of the first and second capacitors C1 and C2, so that a current amount of the first board connector 121 input from the first transformer 146 becomes smaller than a current amount of the second board connector 122 input from the second transformer 147.

Also, a current amount output to the first board connector 121 can be controlled by controlling the capacitances of the first and second capacitors C1 and C2 of the current attenuator 151. Here, the current amount attenuated by the current attenuator 151 can be controlled to almost the same amount as a current amount that leaks by the length of the second cable 163.

The first voltage detector 153 is connected in parallel to the path P1 at the high end of the second coil T2 of the first transformer 146, and comprises a fifth capacitor C5, a third capacitor C3, a fourth capacitor C4, a first diode D1, a fourth resistor R4, a fifth resistor R5, and a second diode D2. The fifth capacitor C5 is connected in parallel at the high end of the second coil T2 of the first transformer 146. The fourth capacitor C4 is connected in series to one end of the fifth capacitor C5, and one end of the fourth capacitor C4 is grounded. The third capacitor C3 is connected in parallel to both ends of the fourth capacitor C4. The anode terminal of the first diode D1 is grounded, and the first diode D1 is connected to the other end of the fourth capacitor C4. The anode terminal of the first diode D1 is grounded, and the first diode D1 is connected in parallel to the both ends of the fourth capacitor C4. The fourth resistor R4 and the fifth resistor R5 divide a voltage applied to one end of the fifth capacitor C5. The second diode D2 outputs a voltage Vf1 applied through the fourth resistor R4, and prevents a reverse voltage from being applied.

The second voltage detector 155 is connected in parallel to the path P2 at the high end of the second coil T2 of the second transformer 147, and comprises a sixth capacitor C6, a seventh capacitor C7, an eighth capacitor C8, a third diode D3, a sixth resistor R6, a seventh resistor R7, and a fourth diode D4. Since the second voltage detector 155 operates in the same manner as the first voltage detector 153, detailed descriptions thereof are omitted.

The first AC power output from the first board connector 121 of the inverter board 120 passes through the first cable 161 and is supplied to one ends of the lamps 190 connected to the first lamp connector 191. The second AC power output from the second board connector 122 passes through the second cable 163 and is supplied to the other ends of the lamps 190 connected to the second lamp connector 193.

The first AC power output to the first board connector 121 is attenuated by the current attenuator 151 and the attenuated current amount is supplied to the one ends of the lamps 190. The second AC power output to the second board connector 122 leaks while it flows through the second cable 163, and the leaked current amount is supplied to the other ends of the lamps 190. Accordingly, the current amounts applied to both ends of the lamps 190 are almost the same, and so the lamps 190 can be lighted-on with the same brightness over their entire region.

Figure 5:
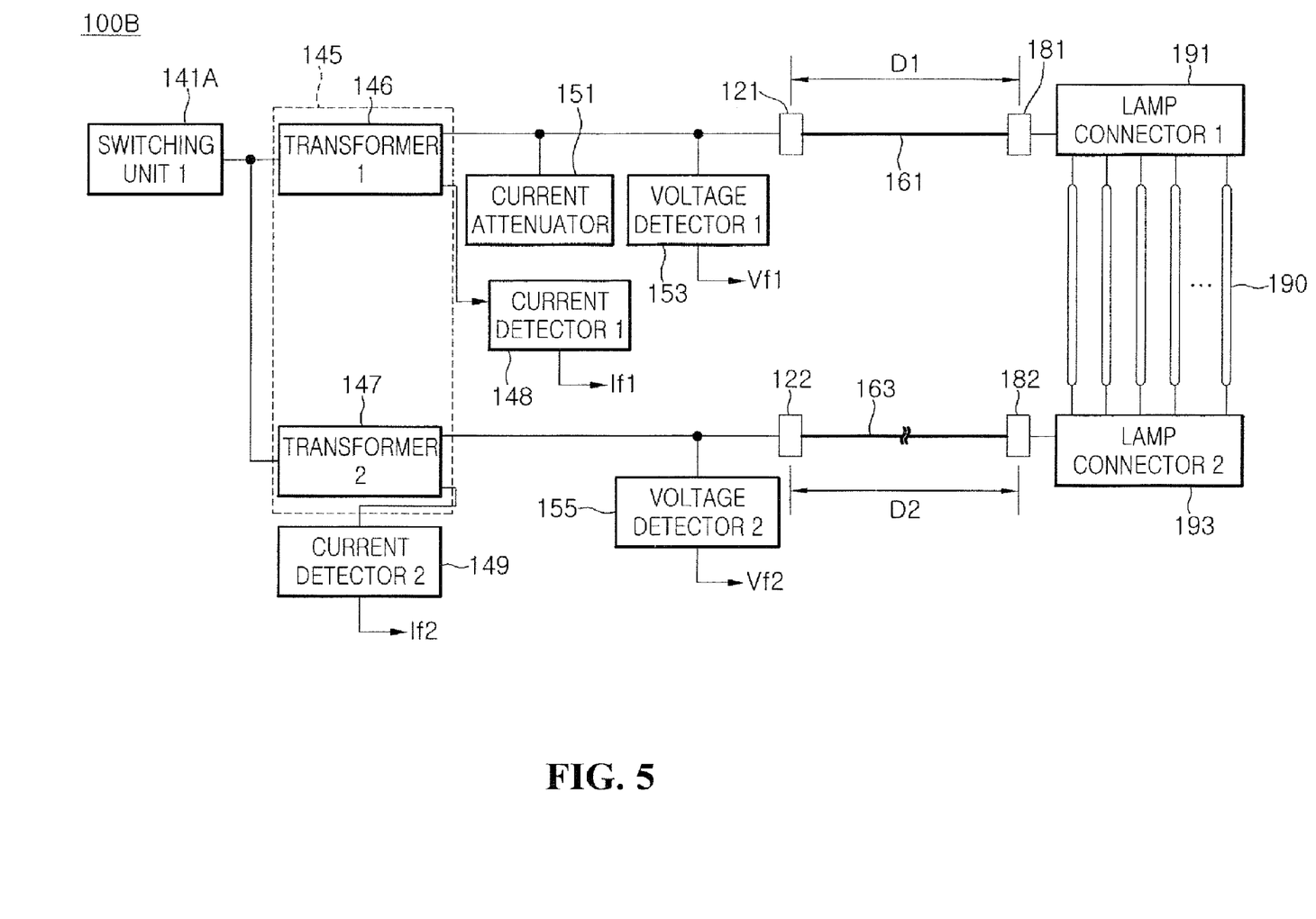
FIG. 5 is a view of an apparatus for controlling a lamp driving according to a second embodiment.

FIG. 5 is a view of an apparatus for controlling a lamp driving according to a second embodiment. In describing the second embodiment, descriptions of the same parts as those of the first embodiment are omitted.

Referring to FIG. 5, the apparatus for controlling the lamp driving 100B supplies power to first and second transformers 146 and 147 using a switching unit 141A. That is, the first transformer 146 and the second transformer 147 can be driven using power output from one switching unit 141A. The switching unit 141A can be used when a load capacity of the lamp is small.

Figure 6:
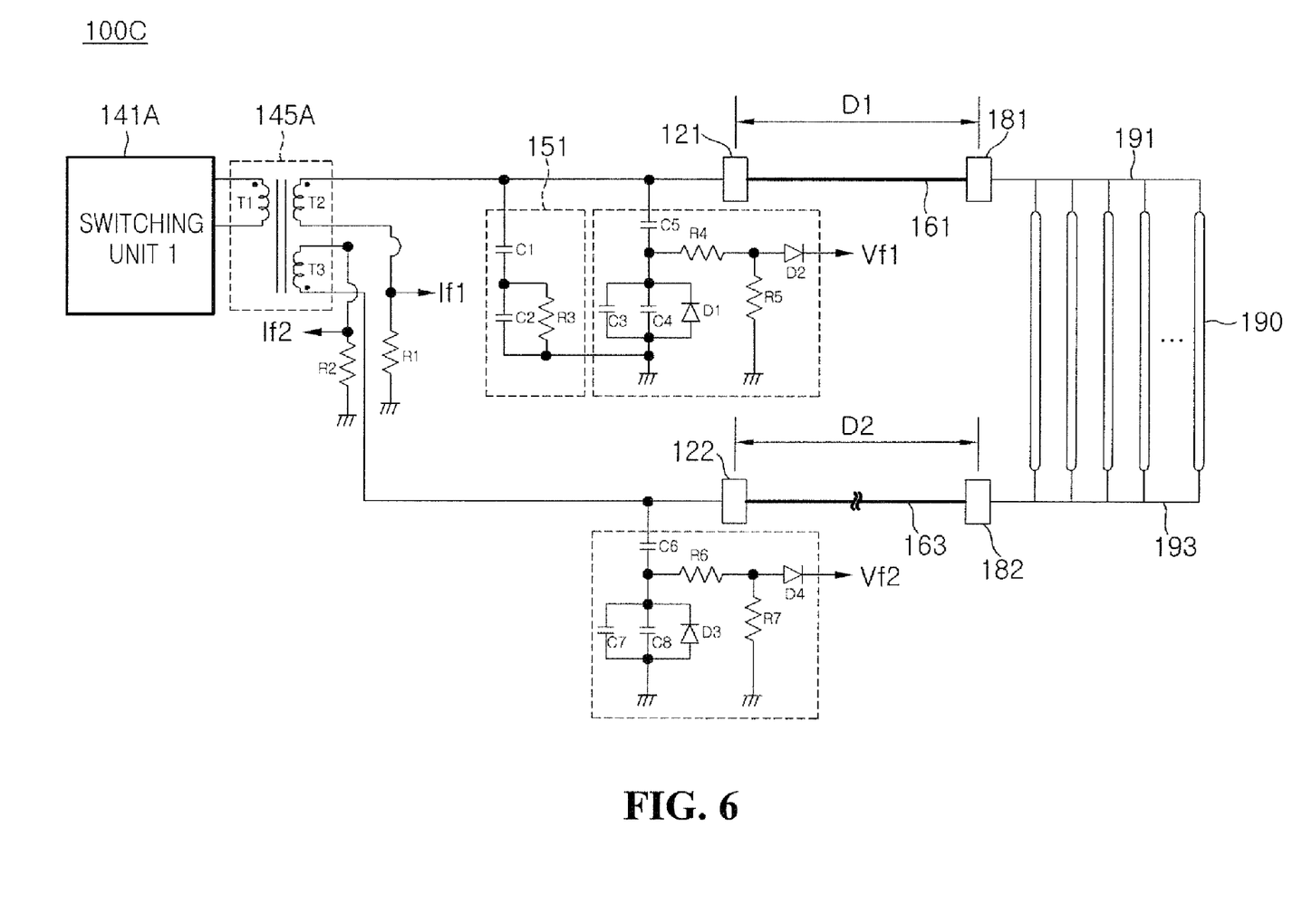
FIG. 6 is a view of an apparatus for controlling a lamp driving according to a third embodiment.

FIG. 6 is a view of an apparatus for controlling a lamp driving according to a third embodiment. In describing the third embodiment, descriptions of the same parts as those of the first embodiment are omitted.

Referring to FIG. 6, the apparatus for controlling the lamp driving 100C comprises a switching unit 141A and a transformer 145A. When power is supplied to the switching unit 141A, the transformer 145A supplies a high voltage current to one ends of lamps 190 by a turns-ratio of a first coil T1 and a second coil T2, and supplies a high voltage current to the other ends of the lamps 190 by a turns-ratio of the first coil T1 and a third coil T3.

Here, the first coil T1 and the second coil T2 of the transformer 145A serve as a first DC-AC converter, and the first coil T1 and the third coil T3 serve as a second DC-AC converter.

The embodiment removes a deviation in currents input to both ends of the lamps 190 using the current attenuator 151, so that the brightness of the lamps 190 have uniform distribution. Accordingly, a display device has brightness of a uniform distribution. Also, the inverter board has the current attenuator, but the structure is not limited to this configuration.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling a lamp driving, the apparatus comprising:
   a trans-portion outputting a first AC power and a second AC power;
   a plurality of lamps lighted-on by the first and second AC powers;
   a first cable and a second cable transferring an output power from the trans-portion to both ends of the lamps; and
   a current attenuator removing a deviation in currents input to both ends of the lamps, wherein the current attenuator attenuates a current flowing through one of the first and second cables whose length is shorter, wherein the second cable is connected having a length longer than a length of the first cable, and the current attenuator is connected with the first cable to attenuate an output of the trans-portion by a leaked amount of a current that leaks while the current flows through the second cable.

2. The apparatus according to claim 1, wherein the current attenuator is connected in parallel to an output path of the first AC power or the second AC power of the trans-portion.

3. The apparatus according to claim 1, further comprising an inverter board comprising the trans-portion and the current attenuator.

4. The apparatus according to claim 3, wherein the inverter board is disposed on a lower side of one end of the lamps, and comprises a first board connector to which the first cable is connected, and a second board connector to which the second cable having a length longer than a length of the first cable is connected.

5. The apparatus according to claim 4, wherein the current attenuator is connected in parallel between the first board connector and an output path of the first AC power of the trans-portion, and attenuates the first AC power by an amount of a leakage current at the second cable.

6. The apparatus according to claim 1, wherein the trans-portion comprises:
   a first transformer supplying the first AC power to one ends of the lamps; and
   a second transformer supplying the second AC power to the other ends of the lamps.

7. The apparatus according to claim 1, further comprising a switching portion supplying a DC power to the trans-portion.

8. The apparatus according to claim 1, wherein the current attenuator comprises:
   a first capacitor connected in parallel between the trans-portion and the first cable;
   a second capacitor connected in series to the first capacitor, one end of the second capacitor being grounded; and
   a resistor connected in parallel to both ends of the second capacitor.

9. An apparatus for controlling a lamp driving, the apparatus comprising:
   a first DC-AC converter outputting a first AC power;
   a second DC-AC converter outputting a second AC power; and
   a current attenuator controlling an amount of a current of the first AC power to remove a deviation in currents at both ends of a plurality of lamps; a first cable transferring the first AC power to one ends of the plurality of lamps; and a second cable transferring the second AC power to the other ends of the plurality of lamps, wherein the current attenuator is connected in parallel between the first DC-AC converter and the first cable, and attenuates the first AC power by an amount of a leakage current at the second cable, wherein the second cable is connected having a length longer than a length of the first cable, and the current attenuator is connected in parallel between the first DC-AC converter and the first cable.

10. A light unit comprising:
    a plurality of lamps;
    a housing in which the plurality of lamps are disposed;
    an inverter board disposed on one side of the housing, the inverter board outputting a first AC power and a second AC power with a deviation in a current;
    a first cable connected between the inverter board and one ends of the lamps to transfer the first AC power; and
    a second cable connected between the inverter board and the other ends of the lamps to transfer the second AC power, a current attenuator controlling an amount of a current of the first AC power to remove a deviation in current at the both ends of the plurality of lamps, wherein the second cable is connected having a length longer than a length of the first cable.

11. The light unit according to claim 10, wherein the inverter board comprises:
- a controller outputting a gate drive signal;
- a switching portion comprising at least one a switching unit and switching a DC power in response to the gate drive signal of the controller;
- a trans-portion comprising at least one transformer and converting the DC power of the switching portion to a high voltage first AC power and a high voltage second AC power; and
- the current attenuator attenuating the first AC power of the transformer to output the same to the first cable.

12. The light unit according to claim 11, further comprising a detector detecting output voltage and current of the first AC power and the second AC power to feed them back to the controller.

13. The light unit according to claim 11, wherein the current attenuator comprises:
- a first capacitor connected in parallel between the transformer and the first cable,
- a second capacitor connected in series to the first capacitor, one end of the second capacitor being grounded; and
- a resistor connected in parallel to both ends of the second capacitor.

14. The light unit according to claim 10, wherein the inverter board comprises a first board connector and a second board connector, the light unit further comprising:
- a first electrode connector on one sides of the lamps, the first board connector and the first electrode connector being connected to both ends of the first cable; and
- a second electrode connector on the other sides of the lamps, the second board connector and the second electrode connector being connected to both ends of the second cable.

15. The light unit according to claim 10, wherein the plurality of lamps comprises at least one of an external electrode fluorescent lamp (EEFL), a cold cathode fluorescent lamp (CCFL), a hot cathode fluorescent lamp (HCFL), an external & internal electrode fluorescent lamp (EIEF), and a light emitting device (LED).

* * * * *